Feb. 20, 1951 K. R. YATES 2,542,954
AUTOMATIC TELEPHONE SYSTEM
Filed Oct. 2, 1946
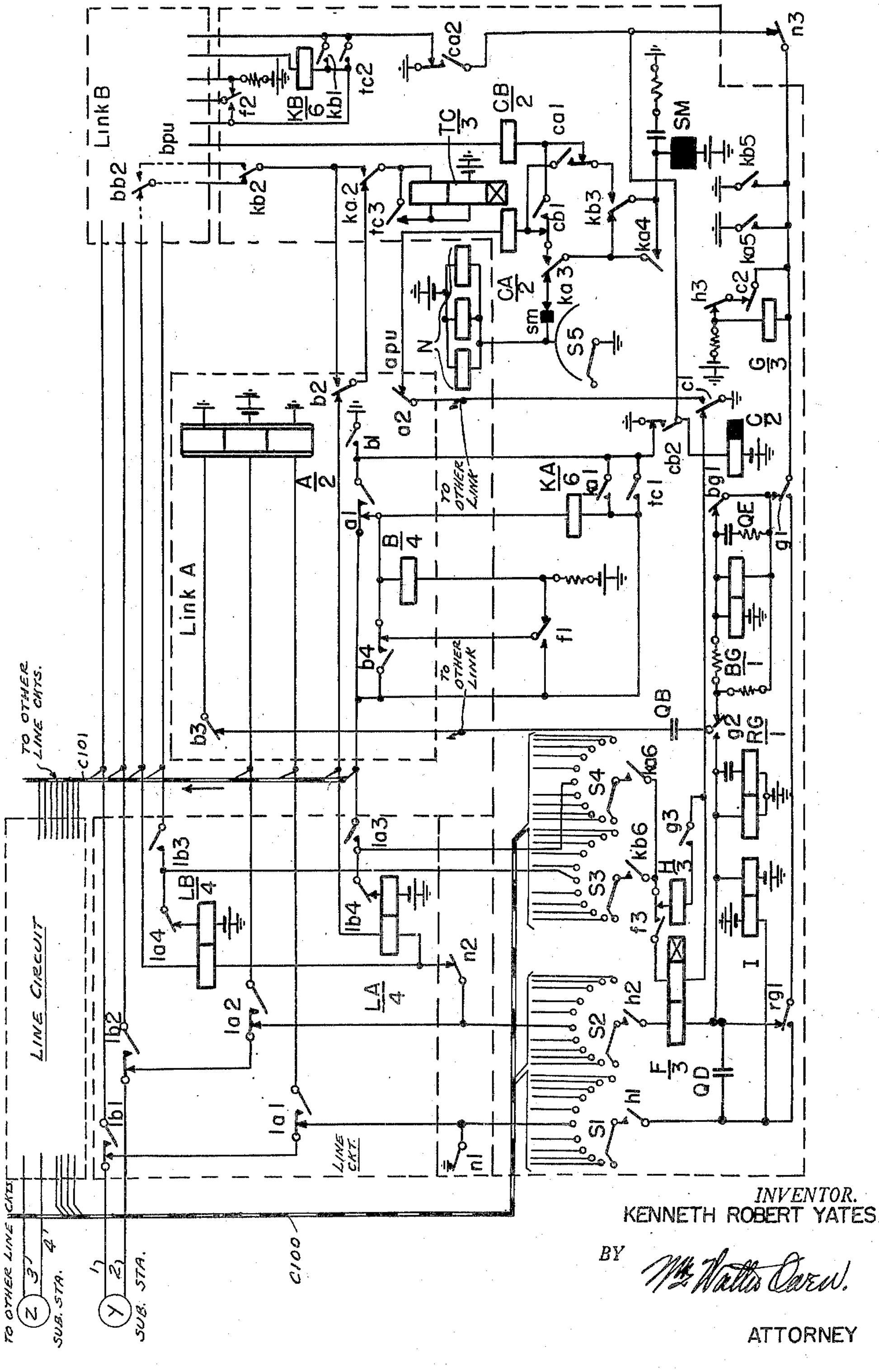
INVENTOR.
KENNETH ROBERT YATES
BY [signature]
ATTORNEY Patented Feb. 20, 1951 2,542,954

UNITED STATES PATENT OFFICE 2,542,954

AUTOMATIC TELEPHONE SYSTEM

Kenneth Robert Yates, Lee, London, England, assignor to Siemens Brothers & Company Limited, London, England, a British company Application October 2, 1946, Serial No. 700,712
In Great Britain October 5, 1945

5 Claims. (Cl. 179—16)

The present invention relates to automatic telephone systems and is more particularly applicable to systems, such as P. A. X systems in which only a small number of lines is involved.

In this invention a calling line is connected to a called line by one of a plurality of link circuits available in common to all the subscribers connected to the exchange. Each line is connected to a line circuit in which the only relays are line relays, each line circuit having as many line relays as there are link circuits. A line relay of a calling line is operated to connect the line to the relevant free link circuit and the corresponding line relay of a called line is only operated on the reply of the called subscriber to a ringing signal to connect that line to the same link circuit. As there are no cut-off relays the ringing current is applied to a called line over back contacts of the line relays and provision is made to prevent operation of line relays by ringing current applied from a common circuit. This feature is carried out by disconnecting the line relays from their respective lines prior to the application of ringing current and such disconnection may be effected by relays common to the plurality of link circuits operable when a dialed impulse is received at the selecting apparatus. A link circuit includes only two relays one of which serves as a feed and impulsing relay and the other as a holding relay. The latter relay may be operable only when the called subscriber replies to a call to bring about the release of common apparatus. All other apparatus including the selecting device may be included in a circuit available in common to the plurality of link circuits and the common circuit will contain apparatus to prevent confusion arising from two link circuits being taken into use at the same time. Preference may be given to one of the link circuits and the arrangements may operate to the end if two link circuits are connected to the common circuit at the same time the link circuit over which the first dialed impulse is received retains the common circuit and the other is disconnected. The common circuit is conveniently connected to the link circuits over a chain of contacts of coupling relays in such a way that when one link is coupled to the common circuit the starting circuit is extended to the next link in the chain. Contacts of the holding relays would be included in the chain to complete the chain after a conversational condition has been set up over a link and the relevant coupling relays have been released.

The nature of this invention will be clearer from a consideration of the following description of the circuits at a 10 line P. A. X illustrated by way of example in the accompanying drawings. The drawings show on the left, a line circuit individual to the subscriber station Y, in the middle, one of a pair of link circuits and the connection to the other link circuit and below, common selecting and ringing equipment. A block diagram representing a second line circuit individual to the subscriber Z is shown as connected to the two link circuits and the contact arcs of the stepping switch, by way of cables C101 and C100 respectively. It will be understood that the cables C101 and C100 connect the line circuits of the other subscribers to the two links and to the stepping switch also. It will also be understood that the line circuits of subscriber Z and the other subscribers contain equipment identical to that as shown in detail for subscriber Y. The line circuit of subscriber Y includes only two relays hereinafter termed line relays, relay LA for one link and relay LB for the other link. The link circuit shown in full in the broken line rectangle will be referred to as link A and includes a feed relay A and holding relay B. Link B is indicated by a broken line rectangle on the right and only the contact *bb2* of the holding relay in this link is shown, this contact corresponding to contact *b2* in the A link. There is also a set of three common relays acting as one and designated N operating a total of 21 contacts, 20 contacts such as *n1* and *n2* being in the circuits for the 10 pairs of line relays and the remaining contact *n3* being in the operating circuit for a dialing relay C in the common circuit. The common circuit includes a reverse drive stepping switch with five wipers and associated contact arcs, the driving magnet of which is designated SM, common start relay of the slow to operate type TC, coupling relays KA and KB, one for each link, priority relays CA and CB, one for each link, test relay H, ring trip relay F, a relay G, ringing current generator RG, busy tone generator BG and double wound retard coil I.

When there is no call in progress all the apparatus shown is in its normal unoperated condition and relay TC is connected to link A, the preferred link. When link A is in use relay KA or B will be operated and the start relay TC will be connected to link B. The line relays of all the lines are connected up over contacts of relay N. When a call is initiated and assuming that no call is in process of being set up, one of the line relays will be operated in series with the start relay TC. It will be assumed for the present that both links are free and that subscriber is the calling station desiring to establish a connection with subscriber Z. Accordingly, when subscriber Y removes his receiver relay TC will operate in a circuit from earth over contacts *n1*, *la1*, *lb1*, the calling loop, contacts *lb2*, *la2*, *n2*, low resistance winding of relay LA, contacts *b2* and *ka2* both windings of relay TC in series to battery. Contact *tc1* prepares a holding circuit for relay LA, contact *tc2* prepares a point in the holding circuit for relay LB in case link B is the link to be used and at contact *tc3* short circuits the high resistance winding of relay TC to enable relay LA to operate. Relay LA on operation of contacts *la1* and *la2* connects the calling line of subscriber Y to the feed relay A in link A and disconnects relay TC which releases after a brief interval, at contact *la3* completes the holding circuit for itself over its right hand winding, contacts *lb4*, *tc1* and *cb2* and at contact *la4* disconnects the right hand winding of relay LB from the contact arc accessible by wiper S3, to busy the calling line of subscriber Y against an incoming call over link B. It may be noted that by the use of make-before-break contacts *la1* and *la2* in the line circuit it is ensured that the holding winding of the relay LA is connected up before the circuit of its operating winding is disconnected. Relay A operates over the calling loop and at contact *a1* holds relay LA independently of contact *tc1* and maintains the calling line of subscriber Y, busy by the connection of earth over contacts *cb2* and *la3* should the caller dial his own number and at contact *a2* opens a point in the impulse repeating circuit over wire *apu*. By the operation of contacts *a1* of relay A a short circuit is removed from relay KA and this relay operates in a circuit from earth over contacts *cb2*, *a1*, winding of relay KA, contacts *b4* and *f1* to battery. Contact *ka1* maintains the earth for the operation of relay LA over contact *la3* and contact *ka2* disconnects the operating circuit for relay TC over the A link and connects that relay to link B. Contacts *ka3* and *ka4* prepares a point in the impulse repeating circuit, contact *ka5* operates relay C over contact *n3* and contact *ka6* prepares a point in a circuit for operating the line relay similar to LA of the called line. Relay C on operation connects up the earth to the impulse repeating circuit at contact *c1* and at contact *c2* removes a short circuit from relay G permitting that relay to operate. Relay G operates and at contact *g1* extends earth over contacts *ka5* and *rg1* to the right hand winding of retard coil I and to the ringing current generator RG. This ringing generator operates in known manner and by opening its own operating circuit at contact *rg1* and by the delaying action of the condenser in series with its right hand winding generates pulses which, by suitable design are arranged to have a periodicity of about 17 impulses per second and a 1:1 ratio. The battery connected windings of the retard coil I are connected to opposite plates of condenser QD and back and front contacts of the change over spring set *rg1* and the charge on the condenser is reversed at periods corresponding to the periodicity of operation of generator relay RG. The alternating potential on the condenser QD is fed by way of contact *g2*, condenser QB and contact *b3* to the upper winding of relay A whence it is repeated as dialing tone by induction into the line windings of that relay. The subscriber at station Y now dials the number of the wanted line and relay A responds to the dialed impulses and repeats them at contact *a2* over wire *apu* to magnet SM, the circuit being from earth over contacts *c1*, *a2*, low resistance relay CA (which also operates at this time), make-before-break contacts *cb1*, contacts *ka3* and *ka4*, and magnet SM to battery. Magnet SM responds to the impulses and steps the wipers of the stepping switch accordingly. On the first release of magnet SM, wiper S5 of the stepping switch is stepped on to the off-normal arc and the relays N are operated. Contact *n3* opens in the operating circuit for relay C but this relay is slugged and is maintained operated during impulsing by earth over contacts *ca2* at each impulse break in the line. Contacts *n1* and *n2* open the energizing windings of relays LA and LB, while the other contacts of relay N, similar to contacts *n1* and *n2*, open the energizing windings of all the other line relays. Relay CA operates in series with magnet SM and at contact *ca1* disconnects the impulse repeating circuit over wiper *bpu* from the second link B and at contacts *ca2* keeps relay C operated by means of impulses. At the end of the impulse train relay CA remains released and after a short delay relay C releases. Also at the end of impulsing, wipers S1 through S4 will be engaged with the contacts, on their respective arcs, that correspond to the dialed call number of subscriber Z. Contact *c1*, in restoring, opens a point in the impulse repeating circuit and prepares a test circuit, including relay H, for testing the busy condition of the called line and contact *c2* prepares to reimpose a short circuit about relay G. In testing the called line, it will be remembered that the wipers of the stepping switch are now resting on the contacts, corresponding to the call number of the called line, to which they have been set by the repeated impulses. The called line is tested by relay H in the manner that if the called line is free, battery over the right hand windings of one of the called line relays similar to LA or LB will be present on the contacts in the arcs associated with wipers S3 and S4, and since link A has been described as being in use, relay H will operate in a circuit from earth over contacts *c1*, *g3*, relay H, contacts *f3*, and *ka6*, wiper S4, contacts similar to *lb5* of the called line relay similar to LB, and the line relay similar to LA of the called line to battery. The resistance of this circuit is too high at the present to allow the line relay similar to LA of the called line to operate. Relay H, on operation connects up wipers S1 and S2 at contacts *h1* and *h2* and contact *h3* opens to prevent the short circuit of relay G from becoming effective to release relay G when contacts *c2* were closed. Alternating current derived from condenser QD is now fed over contacts *h1* and *h2*, wipers S1 and S2 and back contacts of the two line relays of the called line to the called subscribers' instrument and his bell is rung. A low resistance winding of relay F is included in the ringing circuit but this relay is heavily slugged to prevent its operation by ringing current. The caller continues to receive tone over relay A. When the called subscriber Z replies to the call and loops his line, relay F is operated by D. C. over the line fed over retard coil I and earth over contacts *ka5*, *g1* and *rg1*. Relay F locks up from earth at contact *c1*, right hand winding of relay F, contacts *f3* and *ka6* and to battery in series with the right hand winding of line relay similar to LA of the called line, and at contacts *f3* the circuit to relay H is opened. The line relay similar to LA of the called line is now operated in this series circuit to switch the called line to the link circuit in use and to disconnect the other line relay similar to LB of the called line from link B. Contact f1 removes a short circuit from relay B and that relay operates in a circuit from earth over contacts cb2, a1, f1, b4, relay B to battery. Contact f2 performs a similar function for the corresponding relay in link B should that link have been used. At contact b1 relay B applies a holding earth for the line relays such as LA of the calling and called lines over contacts a1, la3 and lb4 and locks itself to this earth over contact b4. Contact b2 disconnects the start wire in the link A and prepares a circuit for relay TC over the start wire of link B and contact b3 disconnects tone from relay A.

Consequent on the disconnection of relay H the ringing current is cut off and relay G is released by short circuit following the closure of contact h3. Contacts g1 and g2 disconnect the pulse generator and tone circuits. Consequent on the operation of relay B relay KA is short circuited over contacts a1 and b4 and releases. Contact ka2 connects relay TC over contact b2 to the start wire in link B, contact ka3 closes the homing circuit for the stepping switch through contacts ka3, kb3 and wiper S5, contact ka5 disconnects the earth for operating the pulse and tone generators and opens the initial operating circuit for relay C, and contact ka6 releases relay F. Magnet SM operates in a circuit over wiper S5, its own armature contact sm and contacts ka3 and kb3 and drives the stepping switch by self-interruption to the normal position in which it is stopped by the opening of the homing circuit at wiper S5. Relays N are released. The common apparatus is now in a normal condition and the link is held by relay A.

The talking path from subscriber Y to subscriber Z may be traced from line conductors 1 and 2 of subscriber Y, the closed break contacts lb1 and lb2, the closed make contacts la1 and la2, cable C101 to the line circuit of subscriber Z, closed make contacts similar to la1 and la2, closed break contacts similar to lb1 and lb2 and to the line conductors 3 and 4 of subscriber Z. The feed relay A of link A provides the common talking battery for the connection.

At the end of the conversation when both subscribers Y and Z have replaced their receivers relay A releases disconnecting relay B and the two line relays such as LA at contact a1 and those relays release and the link is restored to normal.

If, when the called line is tested, it is found busy, relay H fails to operate as there will be no circuit over the contact on which wiper S3 or S4 is resting or, if he has dialled his own number, this contact will be earthed and relay G will release shortly after the release of relay C. Busy tone current generated by the combination of busy relay BG and its contact bg1 and condenser QE will flow over condenser QB and the upper winding of relay A whence the tone will be induced into the line windings and transmitted to the caller.

Similarly, if a call is abandoned by a caller the release of relay A short circuits the coupling relay such as KA to release it and close the homing circuit for the stepping switch.

In the event of a second call arriving at the exchange before impulses have been received from the first, relay similar to LA of one subscriber the relays will be operated in the manner already described and on the operation of relay KA, the relay similar to LB of the other subscriber will be operated over contacts bb2, kb2 and ka2 and relay TC. Consequently relay KB will be operated. Relay C will operate and both links will be connected to the common apparatus. The first caller to dial is successful in getting control of the common apparatus. If it be assumed that the subscriber connected to link A is the successful one, the first operation of relay A will operate relay CA in series with magnet SM and contact ca1 will open the impulse repeating circuit over wire bpu in link B. Contact ca2 will release relays KB and LB and when relays N operate on the completion of the first step by the stepping switch the line relay of the caller who was later in dialling is disconnected. Exactly similar operations occur if the caller on link B should dial first, relay CB bringing about the release of relays KA and LA and the disconnection of the other calling line. Similar operations will take place if a link is seized due to a faulty line, the seizure of the other link by a caller freeing the first link when the first dialled impulse is received, the faulty line being disconnected so long as the common apparatus is in use.

If two subscribers connected, on to one link and one to the other should dial simultaneously the one connected to link A will be given priority by the connection of contact ca1 in the impulse repeating circuit over contact kb3 thereby providing a circuit for relay CA and magnet SM independently of relay CB which relay will have its circuit opened at contact ca1. The release of relay KB will not affect impulse repetition as by the time contact kb3 falls back the circuit over contacts cb1, ka3 and ka4 will have been closed. It may here be mentioned that the fore-end slug on relay TC exercises a retarding effect covering the interval between the release of a coupling relay and the operation of the N relays thereby preventing the line relay of the unsuccessful caller of a pair buzzing. It also provides a delay in release sufficient to cover operation of relay A.

I claim:

1. In an automatic telephone system, a plurality of subscriber's lines, a plurality of link circuits for connecting calling and called ones of said lines, a line circuit for each line terminating in a plurality of line relays, one for each link circuit, means responsive to the initiation of a call over one of said lines for operating one of the line relays thereof to associate the calling line with an idle one of said link circuits, means controlled over the associated link circuit by the calling subscriber to select and signal the called subscriber, and means controlled by the response of the called subscriber to operate the one of the line relays individual to said called line and individual to said associated link circuit to connect the line of the called subscriber with the associated link circuit.

2. A telephone system such as claimed in claim 1 in which the line relays of each line are the only relays individual to the lines, and equipment common to all said subscriber's lines in which there is means controlled over the link circuit associated with a calling line, responsive to the receipt of an impulse thereover, to disconnect all line relays from their lines until the call has been completed or abandoned.

3. In an automatic telephone system, a plurality of subscriber's lines, link circuits common thereto, a line circuit for each line having only line relays connected to the line, one for each common link, a ringing circuit, equipment common to said link circuits including ringing equipment, said ringing equipment operated over said ringing circuit to signal a called line, contacts for disconnecting all line relays from their lines controlled by said common equipment and operated before said ringing circuit is closed to signal a subscriber over its line and individual normal contacts controlled by each of said line relays, said ringing circuit completed over the normal contacts of a particular line relay.

4. In a telephone system, a plurality of subscriber's lines, a plurality of link circuits each including only a battery feed relay and a holding relay, a line circuit individual to each line having only a number of line relays therein, one for each of said link circuits, a common control equipment common to said link circuits, the line relay of a calling line corresponding to an idle link operated upon initiation of a call to seize an idle link, the common equipment operated by impulses over the calling line to the seized link to signal the called subscriber, and means controlled by the response of the called party for operating the line relay thereof corresponding to the seized link and release the common equipment.

5. In a telephone system, a plurality of subscriber's lines, a plurality of link circuits available to individual ones of said lines, a plurality of line relays for each line, each of said line relays for each line associated with a different one of said links, means controlled by the operation of a line relay of one line to connect that line with its associated idle link circuit, a common control circuit for said link circuits having means controlled by impulses received over a calling line to select and signal a called line, and means in the common circuit for connecting the common circuit to that link over which an impulse is first received from a calling subscriber.

KENNETH ROBERT YATES.

REFERENCES CITED

The following references are of record in the file of this patent:

UNITED STATES PATENTS

| Number | Name | Date |
|---|---|---|
| 1,540,419 | Powell | June 2, 1925 |
| 1,656,300 | Stehlik | Jan. 17, 1928 |
| 1,802,446 | Schneckloth | Apr. 28, 1931 |
| 2,277,191 | Wilbur | Mar. 24, 1942 |
| 2,344,653 | Staszak | Mar. 21, 1944 |